(12) United States Patent
Felch et al.

(10) Patent No.: US 8,747,667 B2
(45) Date of Patent: Jun. 10, 2014

(54) WATER FILTER APPARATUS INCORPORATING WALNUT SHELL FILTER MEDIA AND A DRAFT TUBE SYSTEM

(75) Inventors: Chad L. Felch, Mosinee, WI (US); Michael Howdeshell, Ringle, WI (US); Eric A. Lorge, Mosinee, WI (US); Bryan J. Kumfer, Ringle, WI (US); Stuart J. Munson, Minneapolis, MN (US); Matthew Patterson, Hatley, WI (US)

(73) Assignee: Siemens Energy, Inc., Orlando, FL (US)

( * ) Notice: Subject to any disclaimer, the term of this patent is extended or adjusted under 35 U.S.C. 154(b) by 397 days.

(21) Appl. No.: 13/119,497

(22) PCT Filed: Sep. 23, 2009

(86) PCT No.: PCT/US2009/058005
§ 371 (c)(1),
(2), (4) Date: Mar. 17, 2011

(87) PCT Pub. No.: WO2010/036692
PCT Pub. Date: Apr. 1, 2010

(65) Prior Publication Data
US 2011/0163049 A1    Jul. 7, 2011

Related U.S. Application Data

(60) Provisional application No. 61/099,597, filed on Sep. 24, 2008, provisional application No. 61/099,600, filed on Sep. 24, 2008, provisional application No. 61/099,604, filed on Sep. 24, 2008, provisional application No. 61/175,579, filed on May 5, 2009.

(51) Int. Cl.
*B01D 24/46* (2006.01)

(52) U.S. Cl.
USPC .......................................... 210/274; 210/275

(58) Field of Classification Search
USPC .......... 210/280, 269, 274–276, 279, 286, 795
See application file for complete search history.

(56) References Cited

U.S. PATENT DOCUMENTS

| | | | |
|---|---|---|---|
| 3,464,967 A | 9/1969 | Overcashier et al. | |
| 4,330,401 A * | 5/1982 | Boze et al. | 210/106 |
| 4,496,464 A * | 1/1985 | Hensley | 210/792 |
| 4,530,767 A | 7/1985 | Hirs | |
| 4,891,142 A * | 1/1990 | Hering, Jr. | 210/792 |
| 5,114,595 A * | 5/1992 | Hensley | 210/792 |
| 5,308,479 A * | 5/1994 | Iwai et al. | 210/151 |
| 6,287,474 B1 * | 9/2001 | Dean | 210/796 |
| 6,299,775 B1 | 10/2001 | Elston | |
| 2004/0074836 A1 | 4/2004 | Long | |
| 2011/0174746 A1 | 7/2011 | Felch et al. | |

FOREIGN PATENT DOCUMENTS

| | | | | |
|---|---|---|---|---|
| RU | 2136347 C1 | 7/2003 | | |
| WO | WO9014313 A1 * | 11/1990 | | C02F 3/08 |

\* cited by examiner

*Primary Examiner* — Matthew O Savage (57) ABSTRACT

The present invention relates generally to a system and method for treating wastewater in a filter media apparatus having a draft tube system. The filter media may be walnut shell media.

7 Claims, 10 Drawing Sheets

WATER FILTER APPARATUS INCORPORATING WALNUT SHELL FILTER MEDIA AND A DRAFT TUBE SYSTEM

RELATED APPLICATIONS

This application claims priority under 35 U.S.C. §119(e) to U.S. Provisional Application Ser. No. 61/099,604, titled "PULSED BACKWASH FOR WALNUT SHELL FILTER," filed on Sep. 24, 2008; and U.S. Provisional Application Ser. No. 61/099,608, titled "PULSED AIR WALNUT SHELL FILTER," filed on Sep. 24, 2008; and U.S. Provisional Application Ser. No. 61/099,597 titled "WALNUT SHELL FILTER PROCESS," filed on Sep. 24, 2008; and U.S. Provisional Application Ser. No. 61/165,579, titled "TUBE DESIGN AND PROCEDURE FOR WALNUT SHELL FILTER," filed on May 5, 2009, each of which are incorporated by reference in their entireties for all purposes.

BACKGROUND OF INVENTION

1. Field of Invention

The present invention relates to a system and method for treating wastewater, and more particularly to a wastewater treatment system and method utilizing a walnut shell filter media.

2. Discussion of Related Art

Walnut shell filter media is known for its affinity for both water and oil, making it a desirable filter media and is typically used for the removal of oil from water and wastewater. Conventional walnut shell filters include pressurized deep bed applications in which the water is forced through a bed depth. Periodic backwashes are also routinely conducted to regenerate the bed. Typical backwash methods include expanding or turning the bed by imparting energy to the bed.

Conventional backwash systems include mechanical mixing and mechanical scrubbing with impellors and recycle lines, as well as the introduction of high velocity gas or high velocity water in a countercurrent direction. Mechanical systems used to backwash beds increase the initial costs of the system and may lead to increased maintenance costs to service mechanical seals. Recirculation of the bed also increases the initial and maintenance costs of the filter unit and increases the footprint of the filter unit with additional pumps for recirculation. The mechanical backwash methods also utilize backwash fluid to remove any oil and suspended solids released from the bed, which leads to the generation of significant amounts of backwash fluid. Similarly, the use of high velocity backwash liquid generates a large volume of backwash fluid. Conventional backwash systems are also known to create dead spots in which the filter media is not sufficiently turned and/or in which the backwash fluid does not reach, effectively leaving oil and suspended solids in the bed.

A need remains for a compact walnut shell filter media unit having a footprint sufficiently small to be used in offshore applications. Moreover, there is a need to reduce the amount of backwash water generated during backwash of the walnut shell filter unit and to reduce the number of dead spots which are not contacted by the backwash fluid.

SUMMARY OF INVENTION

In accordance with one or more embodiments, the invention relates to a system and method of treating wastewater.

In one embodiment, a filter apparatus having a vessel, a walnut shell filter media positioned in the vessel and a feed inlet positioned in the vessel above the filter media. The filter apparatus may have a draft tube system positioned in the filter media which may be constructed and arranged to substantially roll the filter media. The filter apparatus may also have a first fluid inlet constructed and arranged to deliver a first fluid to the draft tube system and a filtrate outlet positioned below the filter media.

Another embodiment is directed to a system for filtering wastewater. The system includes a source of wastewater comprising oil and suspended solids and a plurality of filter units. Each filter unit includes a vessel, a walnut shell filter media positioned in the vessel and a feed inlet positioned in the filter media and fluidly connected to the source of wastewater. The filter unit also includes a draft tube system positioned in the filter media constructed and arranged to substantially roll the filter media, a first fluid inlet constructed and arranged to deliver a first fluid to the draft tube system, and a filtrate outlet positioned below the filter media. The filter unit also includes a controller in communication with the feed inlet of each of the plurality filter units; the controller configured to generate a first control signal that initiates flow of wastewater to the feed inlet of a first of the plurality of filter units, and to generate a second control signal that interrupts flow of wastewater to the feed inlet of a second of the plurality of filter units.

Another embodiment is directed to a method of filtering a contaminated liquid comprising oil and suspended solids utilizing a filter apparatus having a vessel, a walnut shell filter media positioned in the vessel and a feed inlet positioned in the vessel above the filter media. The filter apparatus may have a draft tube system positioned in the filter media which may be constructed and arranged to substantially roll the filter media. The filter apparatus may also have a first fluid inlet constructed and arranged to deliver a first fluid to the draft tube system and a filtrate outlet positioned below the filter media.

Other advantages, novel features and objects of the invention will become apparent from the following detailed description of the invention when considered in conjunction with the accompanying drawings, which are schematic and are not intended to be drawn to scale. In the figures, each identical or substantially similar component is represented by a single numeral or notation. For purposes of clarity, not every component is labeled in every figure, nor is every component of each embodiment of the invention shown where illustration is not necessary to allow those of ordinary skill in the art to understand the invention.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 2b is a schematic drawing showing an aspect of the operation of the filter apparatus of 2a;

DETAILED DESCRIPTION

The invention is directed to wastewater treatment systems utilizing a filter media bed. "Wastewater," as used herein, defines any wastewater to be treated such as surface water, ground water, a stream of wastewater from industrial and municipal sources, having contaminants such as oil and/or suspended solids, and includes produced water from primary or secondary treatment systems.

One embodiment of the present invention includes a filter apparatus comprising a vessel containing a filter media. The vessel may be open to the atmosphere or closed to operate under pressure. The vessel may be sized and shaped according to a desired application and volume of wastewater to be treated to provide a desired throughput and/or a desired period of operation before a backwash is initiated. The vessel may have any bed depth desired based upon the desired volume of wastewater to be treated and the filter media selected for the particular application. Accordingly, the vessel may have any bed depth of filter media, such as a shallow bed of about 10 inches up to a deep bed of about 66 inches or more. The filter vessel may be constructed of any material suitable for a particular purpose. For example, an open filter vessel may be an open tank formed of cement. In one embodiment, a closed filter vessel may be formed of coated carbon steel, stainless steel, or fiberglass reinforced polymer.

Any filter media suitable for removal of the target contaminant or contaminants may be used so long as it is also suitable for use in a filter bed. One filter media useful in removing oil and suspended solids from wastewater is walnut shell filter media, such as media made from English walnut shells and black walnut shells.

One embodiment of the filter apparatus includes a vessel having one or more sidewalls depending upon the desired shape of the vessel. For example a cylindrical vessel may have one sidewall while a square or rectangular vessel may have four side walls. In one embodiment, the vessel has a cylindrical shape having one continuous sidewall positioned between the first and second walls. In one embodiment, the vessel is closed wherein the one or more sidewalls extend between a first wall and a second wall.

The filter media may be positioned in the vessel at a preselected depth and may fill the entire volume of the vessel or be contained in a particular portion of the vessel. For example, a portion of the volume of the vessel adjacent the first wall and/or the second wall may be free of filter media. Filter media may be contained within the vessel by one or more dividers, such as screens or perforated plates, which retain the filter media in a desired location within the vessel while allowing wastewater to flow throughout the media in the vessel.

In some embodiments, the filter apparatus includes a draft tube system. The draft tube system may be constructed and arranged to intermittently backwash the filter media by providing a desired volume and/or velocity of backwash fluid to roll the bed. As used herein, "rolling the bed" is defined as the movement of the filter media during backwash in which the filter media at or near the second wall of the vessel is partially or completely moved through the draft tube system toward the first wall of the vessel and back toward the second wall of the vessel. The draft tube system may be sized and shaped for a desired application and volume of filter media to be backwashed and/or to operate within a preselected time period for backwash operation. The draft tube system may comprise one or more draft tubes positioned in the media. As used herein, a "draft tube" is a structure having one or more sidewalls open at both ends which when positioned in the filter media provides a passageway for flow of filter media during backwash. In one embodiment, the vessel may have a volume filter media of about 3 to about 6 times the volume of a draft tube or the summation of the volumes of the draft tubes in the draft tube system.

The draft tube may be constructed of any material suitable for a particular purpose as long as it is abrasion and oil resistant. For example, the draft tube may be formed of the same material as the vessel or may be formed of other lighter and less expensive materials, such as plastics, including fiberglass reinforced plastics. The draft tube may be preformed for insertion into the vessel or manufactured as part of the vessel. As such, the draft tube may be designed to retrofit current filter media units. The draft tube system may be supported on the second wall of the vessel. Alternatively, the draft tube system may be supported on a divider or media retention plate, such as a screen or perforated plate, designed to retain the media within a region of the vessel while allowing the flow of liquid and contaminants into and out of the media.

An individual draft tube may be sized and shaped according to a desired application and volume filter media to be backwashed and/or to operate within a preselected time period for backwash operation. The draft tube may also be sized and shaped to provide a desired level of agitation within the draft tube to partially or completely scrub the filter media thereby releasing at least a portion of the oil and suspended solids from the filter media. The desired draft tube system volume may be provided by a single draft tube or by multiple draft tubes having a total volume substantially equal to the desired volume. An individual draft tube may have a cross sectional area of any shape, such as circular, elliptical, square, rectangle, or any irregular shape. The individual draft tube may have any overall shape, such as conical, rectangular and cylindrical. In one embodiment, the draft tube is a cylinder. The draft tube may be positioned in the filter media so as to be entirely enveloped by the filter media as well as to be entirely filled with the filter media. One or both ends of the draft tube may be constructed and arranged to assist flow of filter media into and/or out of the draft tube. For example, the side wall at a first end of the draft tube may include one or more cut outs forming passageways to allow some of the filter media at or near the first end of the draft tube to enter through the sidewall of the draft tube. The cutouts forming the passageways may have any shape to allow a sufficient volume of filter media to enter the draft tube. For example, cut outs may be triangular, square, semicircular or have an irregular shape. Multiple passageways may be identical to one another and uniformly positioned about the first end of the draft tube to equally distribute flow of filter media in the draft tube.

The draft tube or draft tubes may be positioned at any suitable location within the filter media. For example, a single draft tube may, but need not be positioned centrally in relation to the vessel sidewalls. Similarly, multiple draft tubes in a single vessel may be randomly positioned or positioned in a uniform pattern in relation to the vessel sidewalls. In one embodiment, a single draft tube is positioned in the filter media in relation to the vessel so that an axis extending from each end of the draft tube is co-axial with an axis parallel to the sidewall of the vessel. Multiple draft tubes in a single vessel may, but need not be identical in volume or cross sectional area. For example, a single vessel may comprise cylindrical, conical and rectangular draft tubes of varying height and cross sectional area. In one embodiment, a vessel may have a first draft tube centrally positioned having a first cross sectional area and a plurality of second draft tubes positioned adjacent the side wall of vessel in which each of the second draft tubes has a second cross sectional area smaller than the first cross sectional area. In another embodiment, a vessel has a plurality of identical draft tubes.

In another embodiment, the draft tube may include a baffle to prevent or reduce backflow within the draft tube. The baffle may have any size and shape suitable for a particular draft tube. For example the baffle may be a plate suitably positioned on an inner surface of the draft tube or a cylinder positioned in the draft tube. In one embodiment, the baffle may be a solid or hollow cylinder centrally positioned within the draft tube.

The filter media vessel also includes a wastewater feed inlet positioned above the filter media and a filtrate outlet positioned below the filter media. The vessel also includes a first inlet for a first fluid constructed and arranged to deliver the first fluid to a first end of the draft tube to induce during backwash a flow of the filter media within the draft tube from the first end of the draft tube to the second end of the draft tube while inducing flow of the filter media along an outside sidewall of the draft tube from the second end of the draft tube to the first end of the draft tube.

Figure 1:
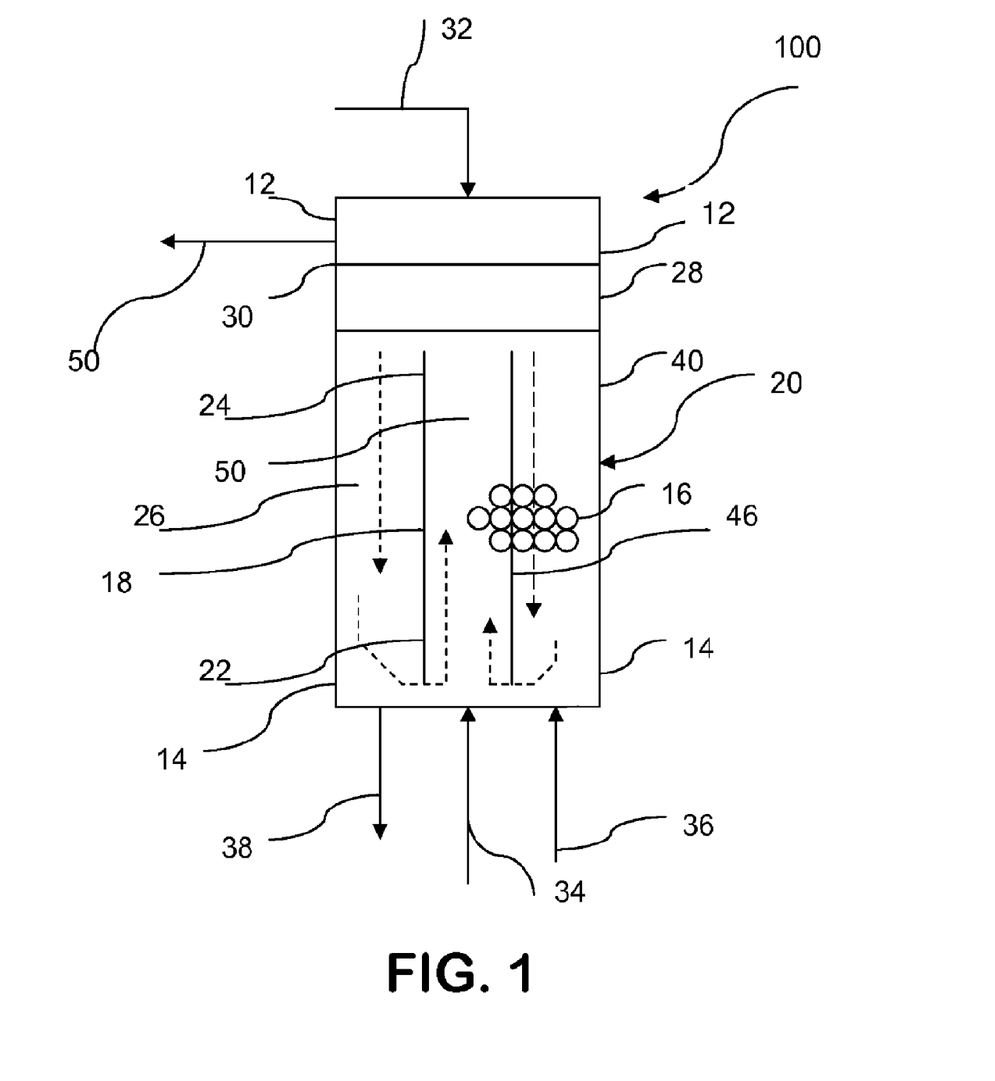
FIG. 1 is a schematic drawing of a filter apparatus according to one or more aspects of the invention.

Operation of the draft tube system during backwashing establishes countercurrent flows within the vessel and causes the filter media to move as exemplarily shown in filter media apparatus 100 in FIG. 1. The filter media 16 moves from the first end 12 of the vessel 20 along the outside of the draft tube 18 to the second end 14 of the vessel 20 where it may then enter the first end 22 of the draft tube 18 adjacent the second end 14 of the vessel 20 as shown by the dashed flow lines (not labeled). The filter media 16 (shown only in part) then moves within the draft tube 18 in inner region 50 from the first end 22 of the draft tube to the second end 24 of the draft tube where it exits the tube and enters a peripheral zone 26 of the vessel 20 as shown by the dashed flow lines (not labeled). As used herein, a "peripheral zone" is an internal volume of the vessel not occupied by the draft tube system. While flowing in the draft tube 18, the filter media 16 may mix thereby releasing a portion of the oil and suspended solids previously immobilized on the filter media. During backwash, upon exiting the draft tube and entering the peripheral zone, the filter media is in a turbulent zone above the draft tube in which the filter media continues to mix releasing additional contaminants, such as oil and suspended solids. Filter media 16 is represented in the figures as uniform spherical particles, however, it is understood that the filter media may be comprised of any particle size and shape, including irregularly shaped particles.

The first fluid may be any fluid to induce movement of the filter media through the draft tube. For example the first fluid may be a gas, such as air or a produced gas; a liquid, such as the filtrate or wastewater to be filtered; and combinations thereof. In one embodiment, the first fluid is a gas. Although the first fluid inlet is shown below the filter media, in other embodiments, the first fluid inlet may be positioned within the draft tube 18. The first fluid inlet may comprise one or more inlets positioned within the vessel to deliver the first fluid to the draft tube system to impart flow of the filter media through the draft tube system. The first fluid inlet may have any configuration suitable for delivering the first fluid to the draft tube. For example, the first fluid inlet may be an orifice, a nozzle, or a jet for delivering a gas, liquid, or combination thereof to the draft tube. In one embodiment the first inlet is a diffuser for delivering the gas to the draft tube.

The filter vessel may also include one or more second inlets to deliver a second fluid to a peripheral zone. The second inlets may deliver the second fluid at or near the second wall of the vessel to induce flow or assist in the flow of media towards the first end of the draft tube. One or more second fluid inlets may be positioned within the vessel to provide backwash flow to the vessel and direct filter media toward the draft tube system. The second fluid may be a gas, a liquid, such as the filtrate or wastewater to be filtered, and combinations thereof. In one embodiment, the second fluid is the wastewater diverted from the wastewater feed inlet or be diverted from the filtrate outlet. The second fluid inlet may have any configuration suitable for delivering the second fluid to the peripheral zone. For example the second fluid inlet may be an orifice, a nozzle, or a jet for delivering a gas, liquid, or combination thereof. In one embodiment, the second inlet extends into the peripheral zone. The second inlet may extend from any suitable location to assist in water distribution. For example, the second inlet may extend into the peripheral zone from the vessel side wall and/or from the draft tube sidewall. In another embodiment, the second inlet may extend into the peripheral zone at an angle having a component tangential to the side wall of the vessel.

In yet another embodiment, the peripheral zone may also include one or more first fluid inlets to further agitate the filter media bed. The first fluid inlets in the peripheral zone may, but need not, be identical to the first fluid inlet constructed and arranged to deliver the first fluid to the draft tube.

The peripheral zone of the vessel may also include a scrub zone located above the second end of the draft tube. The filter media exiting the draft tube may be further mixed thereby releasing additional oil and suspended solids from the filter media during the backwash cycle.

In one embodiment, upon completion of a backwash cycle, setting of the bed may be aided with the introduction of a gas, such as air or produced gas, through the draft tube system to disturb the media sufficiently to allow resettling. The gas may be introduced intermittently during the bed setting stage. The bed may be allowed to settle by gravity between pulses of gas.

Intermittent pulsing of the gas may also coincide with or alternate with intermittent pulsing of liquid through the second fluid inlet. Pulsing bursts of gas and liquid may disturb the bed sufficiently to allow the bed to compact thereby reducing void space and overall bed volume when compared to conventional bed setting techniques. Typically after backwashing, filter media beds are set by gravity and feed forward flow of wastewater, which may result in insufficient set of the media and inefficiencies in which the wastewater short circuits or channels in the filter media and breakthrough of oil and suspended solids.

Another embodiment is directed to a wastewater treatment system including a plurality of filter media units to provide continuous filtration while one or more filter media units are off line because of operating in a backwash cycle or bed setting stage. In the wastewater treatment system, a source of wastewater including at least one contaminant may be fed in parallel to a plurality of media filter units. Wastewater feed flow to one of the filter media units may be interrupted while wastewater feed flow to the remaining filter media units continues. The filter media unit taken offline may then be backwashed and have its bed set before being brought back into service. Once the filter media unit is brought back into service, another of the filter media units may be taken out of service for the backwashing and bed setting cycles.

In some embodiments, the system and/or individual filter media apparatus may include a controller to interrupt and initiate flows as desired. As used herein, the term "interrupt" is defined as complete cessation of flow. A controller may direct the flow of the wastewater feed, the first and second fluids and the gas depending upon the desired operating conditions for the apparatus. The controller may adjust or regulate valves associated with each potential flow based upon signals generated by sensors positioned within the apparatus. For example, a sensor may generate a first signal indicating the pressure drop over the filter media bed has reached a predetermined value thereby triggering the controller to interrupt flow of the wastewater at the feed inlet and to initiate flow of the wastewater through the second fluid inlet and gas through the first fluid inlet. Similarly, the controller can initiate backwash based upon a second signal generated by the passage of a predetermined period of time. The controller may also generate a control signal interrupting wastewater feed to one filter media apparatus and initiating flow of wastewater feed to another filter media apparatus based upon the first signal, the second signal, and combinations thereof.

Figure 2A:
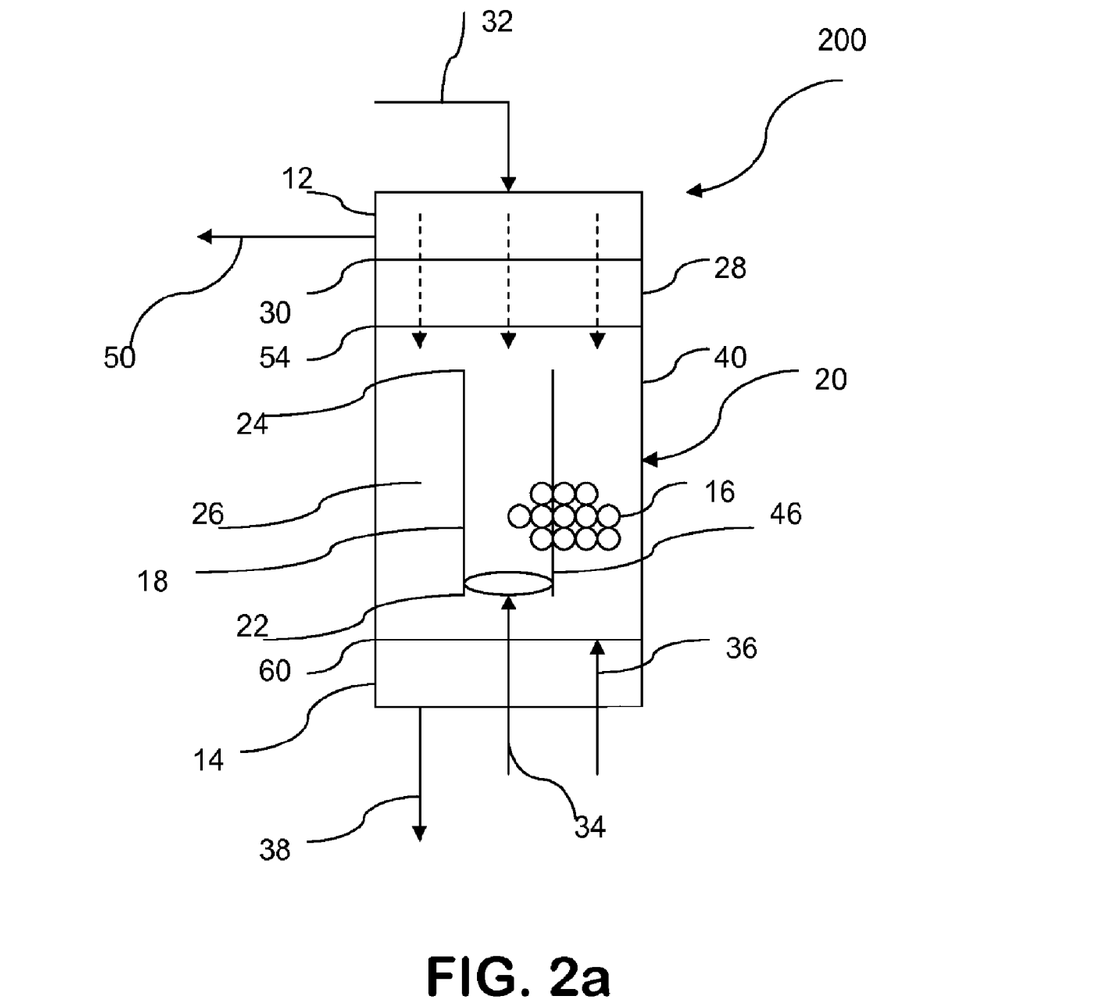
FIG. 2a is a schematic drawing showing one aspect of the operation of a filter apparatus.

Another embodiment is shown in FIG. 2a. Apparatus 200 comprises a cylindrical vessel 20 having a side wall 40, a first wall 42, and a second wall 44. A filter media 16 is contained within a portion of the vessel 20 with media retention plate 30 positioned adjacent the first end 12 of the vessel and screen 60 positioned adjacent the second end 14 of the vessel. Media retention plate may have any structure suitable, such as a screen or a perforated plate to retain the filter media within a portion of the vessel while allowing the feed liquid and contaminants to pass into and out of the media. Vessel 20 also comprises a first end 12 adjacent the first wall 42, a second end 14 adjacent the second wall 44, and a wastewater feed inlet 32 adjacent the first end 12 of the vessel 20 and above the filter media 16. In FIG. 2a, vessel 20 also includes a filtrate outlet 38 positioned below the filter media 16 adjacent the second end 14 of the vessel 20.

In FIG. 2a, a cylindrical draft tube 18 having a first end 22 and a second end 24 is centrally positioned within the filter media 16 such that the first end 22 of the draft tube 18 is adjacent the second end 14 of the vessel. Filter media 16 is also positioned within draft tube 18, and is shown in part in FIG. 2a. The second end 24 of the draft tube is positioned sufficiently below an upper end of the filter media bed so that sufficient filter media is present in the bed to refill the draft tube upon completion of a backwash cycle. A peripheral zone 26 in vessel 20 is a region delineated by the volume of the filter media 16 excluding the space occupied by the filter media in the draft tube 18. A scrub zone 28 in the peripheral zone is positioned above a top surface of the media, between the top surface of the media and a screen 30. Screen 30 is positioned above the scrub zone 28 adjacent the first end 12 of the vessel 20 to prevent loss of media during backwash. Also shown in FIG. 2a is scrub zone 28 in the peripheral zone positioned between an upper surface of the filter media bed 54 and a lower surface of the screen 30. FIG. 2a shows screen 30 though it is understood that any device or structure that maintains the media in the vessel may be used. For example, the media may be retained by a perforated plate or cylinder as well as a cylindrical screen. A first fluid inlet 34 is constructed and arranged to provide a first fluid to the draft tube. In FIG. 2a, a first fluid inlet 34 includes an air diffuser 46. Second fluid inlet 36 is constructed and arranged to deliver the second fluid to the peripheral zone adjacent the second end of vessel 20. The vessel 20 in FIG. 2a includes contaminant outlet 50 for removing contaminants such as oil and suspended solids from the vessel. Optionally, the peripheral zone may comprise one or more first fluid inlets to partially roll the bed during filtration and/or to assist in expanding and rolling the bed during backwash.

During filtration, wastewater containing oil and suspended solids is directed to feed inlet 32, passes through screen 30 and enters the filter media 16 in the bed adjacent the first end 12 of the vessel 20 towards the second end 14 as noted by dashed flow arrows in FIG. 2a. Wastewater simultaneously passes through the filter media 16 in the draft tube 18 from the second end 24 of the draft tube to the first end 22 of the draft tube. Filtrate exits the vessel 20 via filtrate exit 38 and may be directed to further treatment or discharged.

To extend the period of time in which filtration occurs between backwashes, the first fluid may be pulsed to the draft tube via first fluid inlet 34 during the filtration cycle. Optionally, the first fluid may be pulsed via one or more first fluid inlets (not shown) positioned in the peripheral zone during filtration. As used herein, a "pulsed flow" is defined as a flow of fluid which is intermittently interrupted. A pulsed flow may occur at random intervals or may be periodic, in that the flow regularly cycles between off and on at preselected intervals. The period of time in which the fluid flows may, but need not be the same as the period of time in which the fluid flow is interrupted. For example, the fluid may flow for a longer or shorter period of time than the period of time in which fluid flow is interrupted. In one embodiment, the period of time in which the fluid flows is substantially identical to the period of time in which fluid flow is interrupted. Pulsing the first fluid, such as a gas, may partially turn the bed of filter media thereby reducing the pressure drop and extending the run time between backwash cycles. Extending the filtration run time between backwash cycles may reduce the overall number of backwashes thereby reducing the volume of backwash generated during the life of the filter apparatus.

Filtration continues through filter media 16 until it is desirable to clean the filter media by backwashing the filter media. In one embodiment, backwash may be initiated when the pressure drop across the filter media reaches a predetermined value or when the vessel has been in service for a predetermined time.

Figure 2B:
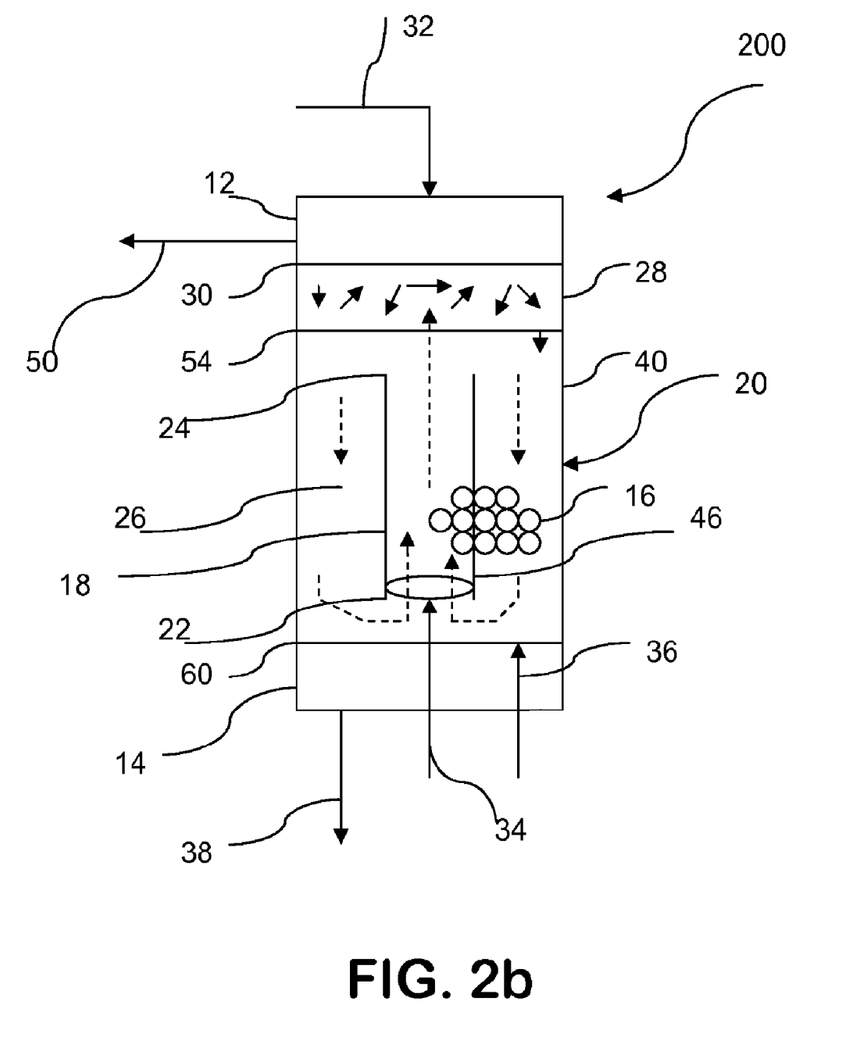

As shown in FIG. 2b, upon initiating a backwash, wastewater flow to feed inlet 32 and flow of the filtrate from the filtrate outlet are interrupted. Flow of gas is initiated through first fluid inlet 34 and diffuser 46 and flow of the wastewater is initiated though second fluid inlet 36. In one embodiment, the flow of the second fluid may occur via a filtrate outlet thereby eliminating a separate inlet for the second fluid. Flow of the gas through first fluid inlet 34 may, but need not, occur before the flow of the second fluid is initialized. In one embodiment the flow of the first and second fluids begins simultaneously, while in another embodiment the flow of the second fluid begins before flow of the first fluid is initialized. Upon introduction of the first and second fluids, the bed of filter media expands and moves in countercurrent flows within the vessel 20 as shown by the flow arrows in FIG. 2b. In FIG. 2b, the filter media adjacent the first end 22 of the draft tube moves toward the second end 24 in a direction counter to the flow of wastewater during filtration. The filter media 16 adjacent the second end 24 of the draft tube moves along the outside of the draft tube towards the first end 22 of the draft tube, thereby partially or completely rolling the bed.

Filter media moving through the draft tube mixes thereby releasing a portion of the oil and suspended solids immobilized on the filter media. Filter media exiting the draft tube may further mix in a scrub zone thereby releasing additional oil and suspended solids from the filter media. The oil and suspended solids are drawn from the vessel 20 via contaminant outlet 50 in FIG. 2b. The gas is also removed from the vessel 20 via contaminant outlet 50.

The first fluid and the second fluid may continuously flow during backwash. Alternatively, the flow of one or both of the first and second fluids may be intermittent. In one embodiment, air continuously flows through the draft tube while water is pulsed into the peripheral zone. The pulsed flow may be periodic, in that the flow regularly cycles between off and on at preselected intervals. The period of time in which the fluid flows may, but need not be the same as the period of time in which the fluid flow is interrupted. For example, the fluid may flow for a longer or shorter period of time than the period of time in which fluid flow is interrupted. In one embodiment, the period of time in which the fluid flows is substantially identical to the period of time in which fluid flow is interrupted.

In another embodiment, the first fluid may be intermittently supplied to the draft tube while the second fluid is continuously supplied during backwash. The second liquid is passed to the filter vessel and into the walnut shell filter media for a first period of time in a direction counter to the flow of the liquid through the vessel and a first liquid is passed through the walnut shell filter media in the draft tube for a second period of time to separate at least a portion of the contaminant from the filter media. The duration of the first period of time may be sufficient to perform a partial roll or one or more complete bed rolls. The flow of the first fluid may be interrupted while the flow of the second fluid continues and contaminants are removed. Flow of filtrate through the filtrate exit may be interrupted and flow of the first fluid may be reestablished. The flow of the first fluid may then be interrupted while the flow of the second fluid continues to once again partially or completely roll the bed one or more times. Again the flow of contaminants may be removed while the flow of the second fluid continues. The flow of the first fluid may be alternated continuously until the desired level of backwash is achieved. To complete the backwash cycle, flow of the first fluid may be interrupted while flow of the second fluid continues and contaminants are removed from the vessel. Upon removal of the contaminants, the flow of the second fluid may be interrupted and feed forward flow of wastewater may be initiated. The combination of pulsed backwashes may result in a partial or one or more complete bed rolls during backwash. In one embodiment, the bed is rolled about 3 times. In another embodiment, the bed is rolled about 4 times.

The pulsed backwash system provides advantages over conventional backwash methods in that it may reduce capital and maintenance costs by eliminating mechanical equipment inside the filter vessel or outside the vessel. The pulsed backwash method may also be simpler to operate since it may eliminate conventional recycle pumps which remove the filter media from the vessel for regeneration and then return regenerated filter media back to the vessel. Maintenance of the conventional recycle pumps is often difficult since these pumps are often located 20 to 25 feet above ground. Flushing of the recycle lines once the backwash cycle is completed may also be difficult and may include manual removal of the filter media. Furthermore, elimination of the mechanical mixers and the recycle pumps reduces system weight and footprint. Also, because backwash components are internal to the vessel, they may be formed of less expensive materials, such as plastics, since they are not operated in a pressure recycle system as are conventional external backwash components. The use of lighter components may also reduce the installation costs in some applications, such as off shore platforms, where installation costs increase significantly with increased system weight. Another advantage is that the gas or air used in the pulsed backwash system may be readily available in many facilities, such as production gas from hydrocarbon production or refinery facilities, thereby eliminating the need for a compressor to supply the gas to the pulsed backwash system. More significantly, because the pulsed backwash system may utilize a gas and a liquid, it reduces the volume of backwash liquid generated. Furthermore, because the filter media is not removed from the vessel during backwash, it's exposure to piping and pumps is reduced so that filter media having a lower modulus of elasticity than conventional filter media may be used. For example, black and English walnut shells are known to provide superior coalescing and filtration of wastewater containing oil, however walnut shell filters are typically filled with the more expensive black walnut shells because it has a higher modulus of elasticity than English walnut shells and therefore has a more durable surface for use in external backwash systems. Because backwashes are performed internally according to one embodiment, it may be possible to use the less expensive English walnut shell without sacrificing efficiency.

Figure 2C:
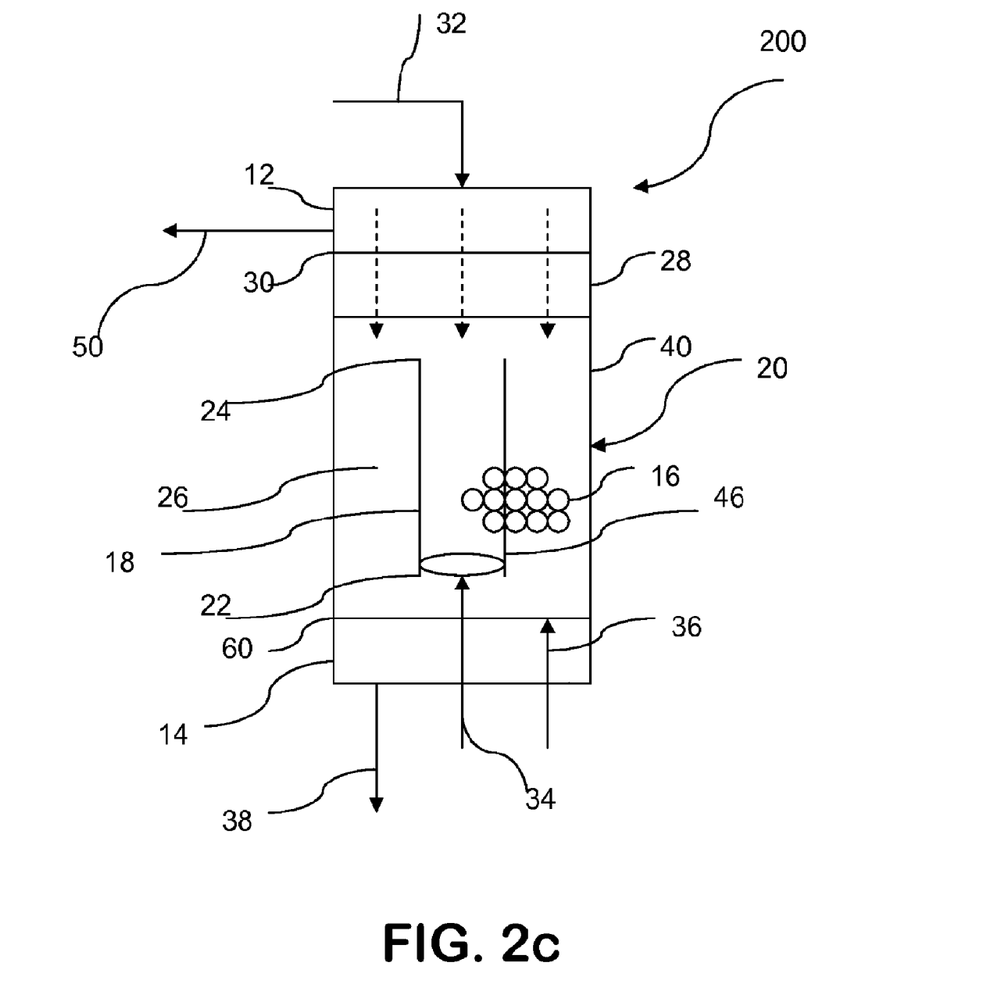
FIG. 2c is a schematic drawing showing an aspect of the operation of the filter apparatus of 2b.

Once it is determined that sufficient oil and suspended solids have been removed from the filter media and/or the backwash has been running for a predetermined period of time, flow of the first and second fluids are then interrupted and wastewater flow to the feed inlet is initiated as shown in FIG. 2c while the filter media sets in the bed.

Figure 3:
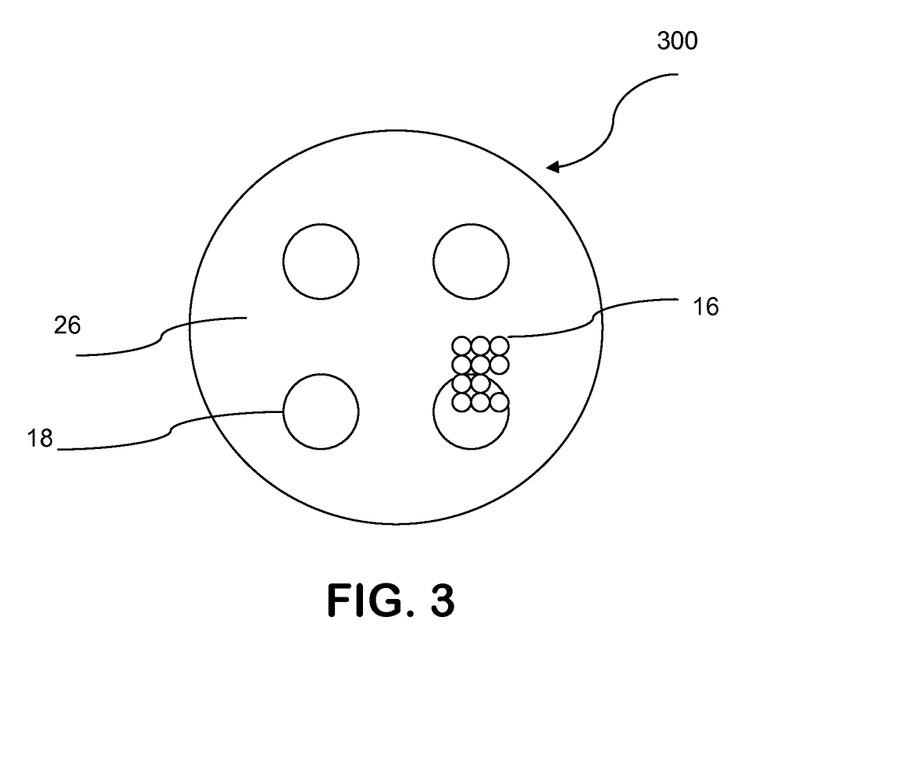
FIG. 3 is a cross-sectional schematic plan view of a filter vessel according to one or more embodiments of the invention.

FIG. 3 is a cross sectional schematic plan view of filter media apparatus 300 similar to filter media apparatus 200 other than filter media apparatus comprises four draft tubes 18 positioned in filter media 16. Filter media apparatus 300 also differs from filter media 200 in that apparatus 300 may also comprise four first fluid inlets (not shown) to direct the first fluid to each of the four draft tubes. Other structural features of apparatus 300 may be similar or identical to those of filter media apparatus 200 and are therefore not shown. Filtration and backwash cycles in apparatus 300 are performed in the same manner as with apparatus 200, other than flow to the four first fluid inlets may be either initiated or interrupted simultaneously. As with apparatus 200, filter media apparatus 300 may optionally include additional first fluid inlets and/or second fluid inlets in the peripheral zone 26 to assist rolling the bed. The presence of multiple draft tubes within the filter media may more uniformly distribute the gas exiting the draft tubes and entering the scrub zone, thereby increasing turbulence in the mixing scrub zone for more effective removal of the oil and suspended solids from the filter media. The elimination of a central draft tube as shown in FIG. 3, though not necessary, may allow for easier and more versatile water distribution.

Figure 4:
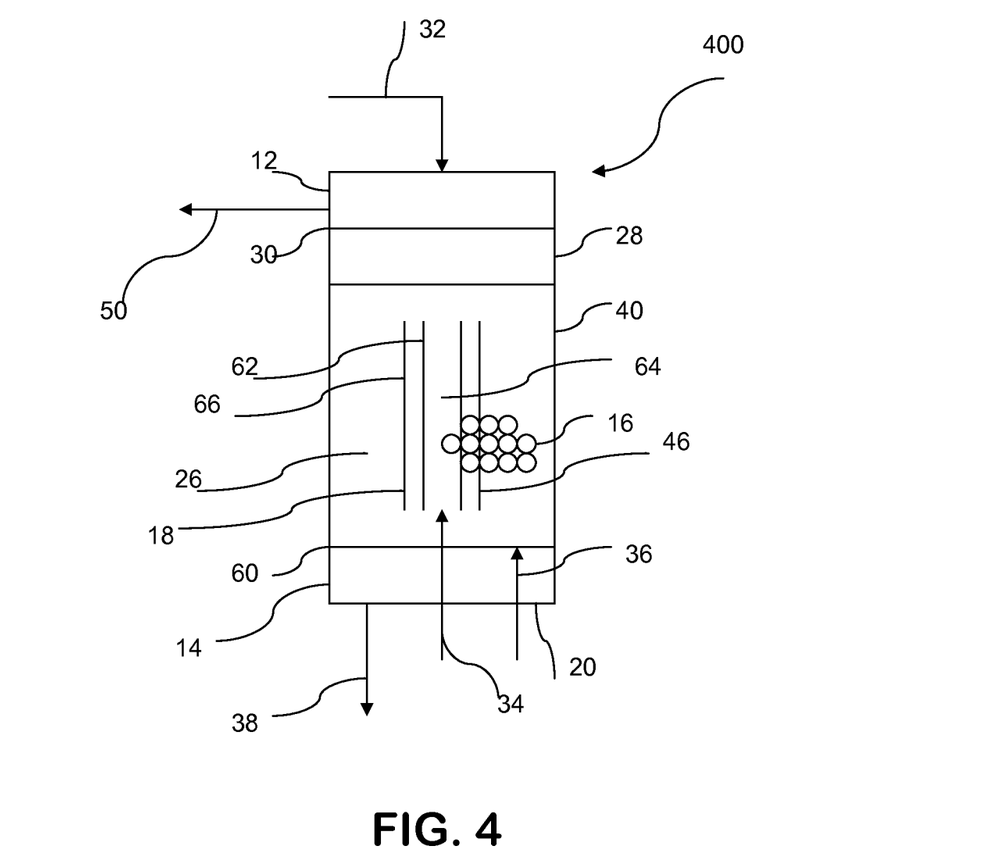
FIG. 4 is a schematic drawing showing a filter apparatus according to one or more aspects of the invention.

FIG. 4 is a schematic drawing of filter media apparatus 400. Filter media apparatus 400 is similar to filter media apparatus with the exception that the draft tube 18 of apparatus 400 includes a baffle 62. A baffle may be advantageous when a diameter of the backwash tube is sufficiently large so as to have the potential for back mixing to occur within the draft tube. Back mixing of the wastewater and filter media within the draft tube may negatively impact the flow and mixing of the filter media in the draft tube resulting in poor suction at the first end of the draft tube and reducing the filter media rolling efficiency. The baffle may be sized and shaped for a particular purpose. FIG. 4 shows a cylindrical baffle 62 centrally positioned within the draft tube 18. Although one draft tube is shown, it is understood that any number and configuration of draft tubes may be used so long as the draft tube system provides the desired volume of media rolling through the vessel.

In apparatus 400, the first fluid inlet 34, such as a gas inlet, may be constructed and arranged to direct air though the entire draft tube including an outer portion 66 bounded by the sidewall of the draft tube and the sidewall of the baffles, as well as though a central portion 64 of the draft tube bounded by the sidewall of baffle 62. The outer region 66 may be an annular region surrounding the cylindrical draft tube and cylindrical baffle. Filtration and backwash cycles in apparatus 400 are performed in the same manner as with apparatus 200. As with apparatus 200, filter media apparatus 400 may optionally include additional first fluid inlets and/or second fluid inlets in the peripheral zone 26 to assist rolling the bed. During backwash, the filter media flows through the central portion 64 as well as the outer region 66, while the filter media in the peripheral zone flows in a counter current direction. During feed forward filtration, the liquid containing contaminant flows through the filter media positioned in the peripheral zone 26, the outer region 66 and the central portion 64.

Figure 5:
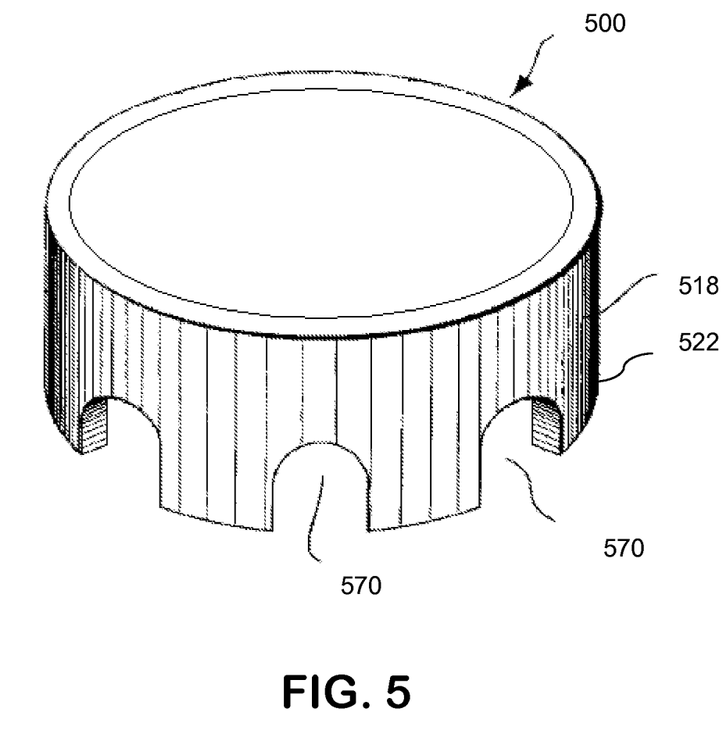
FIG. 5 is an elevated schematic side view of a draft tube base portion according to one or more aspects of the invention.

FIG. 5 is an elevated schematic view of one embodiment of a base portion 500 of a draft tube 518 suitable for use in any of filter media units 200, 300, 400. In this embodiment draft tube 518 comprises a plurality of passageways 570 in the first end 522 of the draft tube. The cut outs may assist the flow of filter media from the peripheral zone (not shown) to the first end 522 and through the draft tube 518. The passageways may be identical to one another and regularly spaced about the second end of the draft tube to provide consistent flow within the draft tube. The passageways 570 may have any size and shape to allow sufficient flow of the filter media and backwash fluid within the draft tube to provide a desired backwash cycle.

Figure 6:
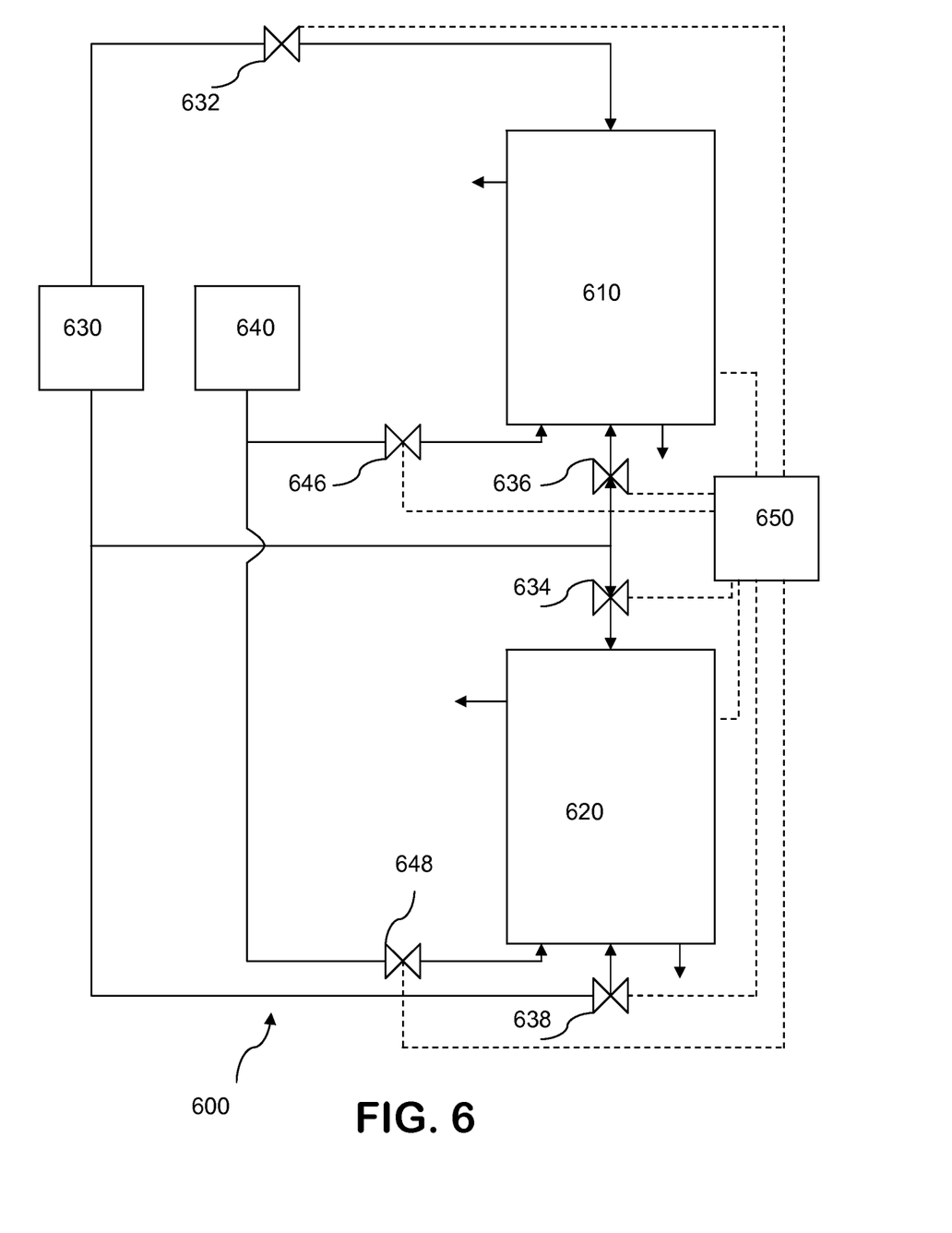
FIG. 6 is a block diagram showing a filter system according to one or more aspects of the invention.

FIG. 6 is a block diagram of wastewater treatment system 600 comprising a first filter media apparatus 610 and a second filter media apparatus 620 operating in parallel. Filter media units 610 and 620 may comprise a vessel, a filter media, and a draft tube positioned within the media. A source of wastewater 630 containing oil and suspended solids is fluidly connected to a wastewater feed inlet of filter media apparatus 610 via valve 632. Similarly the source of wastewater 630 is fluidly connected to a wastewater feed inlet of filter media apparatus 620 via valve 634. The source of wastewater is fluidly connected to a second fluid inlet of apparatus 610 via valve 636, and is also fluidly connected to a second fluid inlet of apparatus 620 via valve 638.

A source of gas 640, such as an air blower, is fluidly connected to a gas inlet to apparatus 610 via valve 646. The source of the gas 640 is also fluidly connected to a gas inlet of apparatus 620 via valve 648.

While apparatus 610 is running in a filtration cycle, valve 632 is open to supply wastewater to the apparatus. Accordingly, valves 636, 646 are closed to prevent backwash of the bed with the wastewater and the gas, respectively.

Apparatus 620 may be operating in a backwash cycle for all or a portion of the time that apparatus 610 is operating in the filtration cycle. While apparatus 620 is operating in the backwash cycle, valve 634 is closed to prevent wastewater from entering the feed inlet of the apparatus. Valves 638, 648 are open to provide wastewater and gas to the backwash cycle. In the system of FIG. 6, controller 650 may respond to a signal generated by a timer indicating a predetermined backwash period has elapsed and generate one or more control signals to cause valves 638, 648 to close and valve 634 to open so that apparatus 620 may operate under filtration conditions.

Optionally, a source of filtrate may be fluidly connected to the second fluid inlet of the first apparatus and to the second fluid inlet of the second apparatus. In another embodiment, the second fluid may be connected to the first and second filtrate outlets to provide the second fluid to the first apparatus and the second apparatus, thereby eliminating separate second fluid inlets.

In the system of FIG. 6, controller 650 may also respond to signals from sensors (not shown) positioned at any particular location within the system. For example, a sensor in filter media apparatus 610 operating in the filtration cycle may generate a signal indicating that the pressure drop across the filter media bed has reached a predetermined value at which it may be desirable to perform a backwash of the media in apparatus 610. The controller 650 may respond by generating one or more control signals to close valve 632 and open valves 636, 646 to start the backwash cycle. The controller 650 may then receive and respond to signals by alternatively place one or both units 610, 620 in service or take one or the other out of service to run a backwash cycle.

During the backwash cycles of either apparatus 610, 620, controller 650 may signal valves 636, 638, 646, 648 to remain continuously open or to open and close intermittently to pulse the backwash. During the switchover of each bed from the backwash cycle, controller 650 may also intermittently open and close valve 646, 648 to provide pulses of gas to the draft tube to aid in setting the bed. A pulse of gas through the draft tube may disturb the bed after which the bed gravity settles. A pulse of gas may then again be directed through the draft tube to again disturb the bed after which the bed gravity settles. The pulsed bed setting may continue for a predetermined period of time or pulses, or until the bed has settled to a desired height, at which time the valves 646, 648 may remain closed as forward feed of the source of wastewater 630 is initiated. During pulsed bed settling with gas, a liquid may, but need not, be pulsed into the vessel via valves 636, 638 to assist settling. Pulsing the liquid may occur between or at the same time as the gas pulses to settle the bed.

Figure 8:
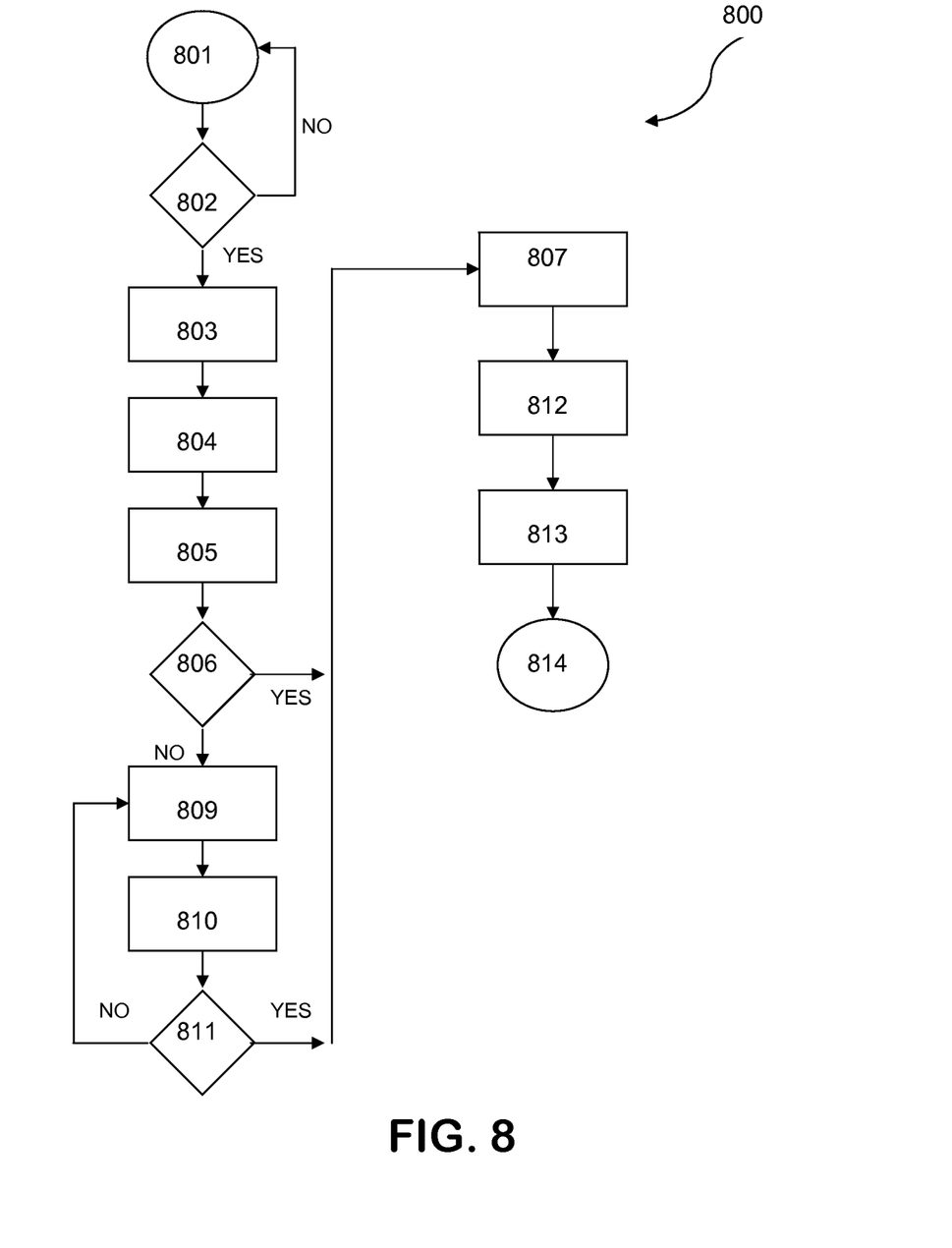
FIG. 8 is a flow chart of one embodiment of the invention.

FIG. 8 is a flow chart illustrating an embodiment of the invention. In FIG. 8, step 801 includes passing a feed liquid to a filter apparatus. Filtrate is removed during feed forward filtration of step 801. While passing the feed liquid, a sensor monitors pressure in first filter apparatus to determine if the pressure drop across the filter media has reached a predetermined value shown in step 802. If the value of the pressure drop has not reached the predetermined value, liquid feed continues to pass through the first filer apparatus as in step 801. If the pressure reading is determined to have reached or exceeded a predetermined value, the flow of feed liquid to the filter apparatus is interrupted in step 803.

In FIG. 8, after the flow of the feed liquid is interrupted, a flow of a first fluid is introduced into a draft tube in the vessel per step 804 in a direction counter to the flow of feed liquid. A flow of a second fluid is also introduced into a peripheral zone per step 805. In step 806, a determination is made as to whether or not the filter media has been sufficiently rolled. This determination may be made upon the overall time period passing in steps 804 and 805. Per step 806, if the filter media has been sufficiently rolled, the flow of the first fluid is interrupted in step 807. If the filter media has not been sufficiently rolled, the flow of the second fluid is interrupted in step 809. After interrupting the flow of the second fluid, the flow of the second fluid is again initiated in step 810. Once again, a determination is made in step 811 as to whether or not the filter media has been sufficiently rolled. If the bed has been sufficiently rolled, the flow of the first fluid is interrupted in step 807. If the filter media has not been sufficiently rolled, the flow of the second fluid is interrupted in step 809. Steps 809-811 are repeated until it is determined in step 811 that the filter media has been sufficiently rolled.

Once the flow of the first fluid has been interrupted in step 807 after a determination that the filter media has been sufficiently rolled, contaminants are removed from the filter apparatus in step 812. After removal of contaminants, the flow of the second fluid is interrupted in step 813 and the flow of the feed liquid to the filter apparatus is reestablished in step 814. Filtrate is again removed during feed forward filtration of step 814.

The function and advantages of these and other embodiments of the present invention will be more fully understood from the following examples. These examples are intended to be illustrative in nature and are not considered to be limiting the scope of the invention.

EXAMPLE I

An experiment was conducted to determine the effectiveness of a pulsed water backwash. A test apparatus was configured with a clear plastic column having a diameter of about 12 inches and a height of about 12 feet. A draft tube having a diameter of about 3 inches and a height of about 5 feet was placed at the center of the column. An air diffuser was attached to an air inlet at the base of the draft tube. Three nozzles for delivering water were equally spaced about the periphery of the column. Each nozzle included an elbow to direct water tangentially in the column. The column was filled with 66 inches of black walnut shells so that the shell bed extended approximately 6 inches above the height of the draft tube.

A series of tests were performed to measure the effect of air and water flow rates during backwash. Backwash efficiency was measured in the velocity of the walnut shells traveling down the outside of the draft tub in the peripheral zone. A portion of the walnut shells were painted for visual confirmation of motion during backwash. Initial results indicated that that by pulsing the water the generation of backwash volume from the walnut shell filter was significantly reduced without sacrificing backwash efficiency.

Further tests were conducted with the above apparatus to compare continuously flowing backwash water to pulsing the water while maintaining a constant flow rate of air through the draft tube. In a first test, the water continuously flowed into the peripheral zone at a rate of about 3 GPM while in a comparative test water flow was pulsed into the peripheral zone with a water pulse of about 6 GPM for about 1 second followed by no flow for about 1 second to achieve an overall flow of 3 GPM. In a second test, the water continuously flowed into the peripheral zone at a rate of about 4 GPM while in a comparative test water flow was pulsed into the peripheral zone with a water pulse of about 8 GPM for about 1 second followed by no flow for about 1 second to achieve an overall flow of about 4 GPM. The results are shown in Table I.

TABLE I

| Water Flow Rate (GPM) | Velocity (in/min) | Time to Roll Bed (min.) |
|---|---|---|
| 3 Continuous | 23.5 | 2.8 |
| 3 Pulsed | 26.4 | 2.5 |
| 4 Continuous | 28.1 | 2.3 |
| 4 Pulsed | 34.2 | 1.9 |

As can be seen, pulsing the water increased the velocity of the walnut shells by about 12 percent and reduces the time to roll the bed by about 11 percent when compared to the continuous flow rates of 3 GPM while producing the same volume of backwash. Similarly, pulsing the water increased the velocity of the walnut shells by about 21 percent and reduces the time to roll the bed by about 17 percent when compared to the continuous flow rates of 4 GPM while producing the same volume of backwash.

These results indicate that pulsing the water during backwash is more efficient so that the backwash cycle may be performed in a shorter period of time, generate less backwash, or a combination of both. Based upon this data, it was estimated that the pulsed backwash would generate 20-30 gallons of water per square foot of filtering area compared to generating about 160 gallons of water per square foot of filtering area with continuously flowing water.

EXAMPLE II

A test was conducted to determine the effectiveness of backwashing a black walnut shell filter having multiple draft tubes in comparison to a single draft tube. In a first test, a vessel having a diameter of 4 feet had one centrally located draft tube having a diameter of 12 inches was fabricated. A portion of the walnut shells were painted for identification and windows were positioned at various locations in the vessel to observe the movement of the walnut shells. In a second test, a vessel having a diameter of 4 feet included 4 draft tubes each having a diameter of 6 inches was fabricated. The 4 draft tubes were equally spaced throughout the vessel. Backwash water volume and gas volume were identical for both tests.

Visual results indicated that the multiple draft tube design was at least as effective at rolling the bed as the single draft tube design, and in some instances was even more effective. Without being bound by any particular theory, the presence of multiple draft tubes more uniformly distributes the air exiting the draft tubes and entering the scrub zone, thereby increasing turbulence in the mixing scrub zone for more effective removal of the oil and suspended solids from the filter media.

EXAMPLE III

A pilot test was conducted to determine the effectiveness of backwashing a black walnut shell filter having a baffle positioned in a draft tube. A filter media vessel having a diameter of 4 feet was fitted with a draft tube made from a 12 inch diameter pipe. A baffle formed from a 6 inch diameter pipe was centrally located in the draft tube. Clear windows were installed in the filter medial vessel in order to observe backwash efficiency. Visual results of the pilot test confirmed that the draft tube with a baffle provided adequate backwash for the 4 ft large diameter vessel.

EXAMPLE IV

A test was conducted to determine the effectiveness of delivering alternating pulses of wastewater and air to a bed of black walnut shell media to set the bed after a backwash cycle. Walnut shell media was conventionally set in a vessel having a diameter of 12 inches by feeding wastewater in a forward flow to a bed depth of 60 inches. The walnut shell media was then expanded during the backwash cycle to a height of 66 inches. For comparison, the bed was conventionally set back to 60 inches with continuously flowing forward feed for about 5 minutes. Forward flow feed was then performed to measure the efficiency of the bed.

Figure 7:
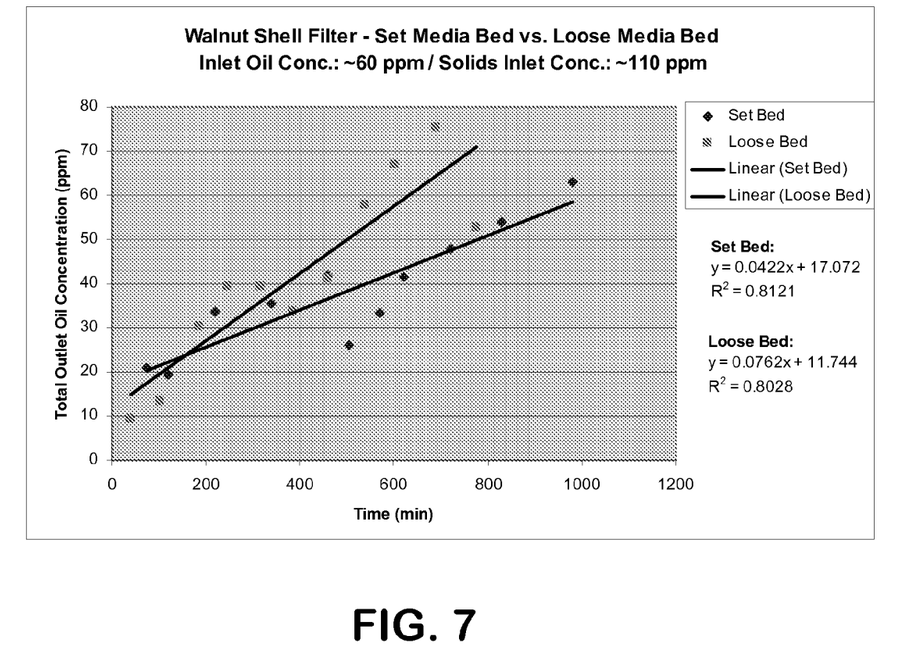
FIG. 7 is a graph showing the total outlet oil concentration verses time according to one or more aspects of the invention.

The walnut shell media was then again expanded to a height of 66 inches after which alternating pulses or short bursts of wastewater and air were added to the walnut shell media in a reverse feed direction for about 2 minutes and allowed to settle. Water was pulsed through the bed at a flow rate of about 1.5 gal/min for one second after which air was pulsed through the bed in a short burst for one second. The bed set to a depth of 53 inches, which is 7 inches less than the original depth resulting in a condensed bed having a reduced void volume in the filter media. Forward flow feed was then performed on the condensed bed to determine the efficiency of the condensed bed compared to the conventionally set bed. The results of the total outlet oil concentration verses time in feed forward filtration are shown in FIG. 7. Linear regression equations were calculated from the data for the conventionally set bed, labeled as a loose bed, and the pulsed set bed, labeled a set bed.

TABLE II

| Time (min) | Total Oil in Effluent (ppm) Conventional Set | Total Oil in Effluent (ppm) Pulsed Set | % Change in Oil in Effluent |
|---|---|---|---|
| 100 | 19.364 | 21.292 | +10.0 |
| 200 | 26.984 | 25.512 | −4.3 |
| 300 | 34.604 | 29.732 | −14.1 |
| 400 | 42.224 | 33.952 | −19.6 |
| 500 | 49.844 | 28.172 | −23.4 |
| 600 | 57.464 | 42.392 | −26.2 |
| 700 | 65.084 | 46.612 | −28.4 |
| 800 | 72.704 | 50.832 | −30.1 |

At seen in the tables above, as filter time increased, the pulsed set bed was significantly more effective in removing total and free oil from the wastewater, by as much as 30 percent at 800 minutes. Similarly the graph also shows that as time increased the pulsed set bed removed more oil than the conventionally set bed.

The pulsed set bed may therefore allow the walnut filter media to be run for a longer period of time than conventionally set beds before it is desirable to run a backwash. Extending the period of time between backwash cycles may also reduce the total amount of generated backwash over the life of the media. Compacting the bed may also result in bed designs with a smaller bed depth reducing vessel size and weight.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items. Only the transitional phrases "consisting of" and "consisting essentially of" are closed or semi-closed transitional phrases, respectively, with respect to the claims. As used herein, the term "plurality" refers to two or more items or components.

What is claimed is:

1. A filter apparatus comprising:
   a vessel;
   a walnut shell filter media positioned in the vessel;
   a feed inlet positioned in the vessel;
   a draft tube system positioned in the walnut shell filter media and constructed and arranged to substantially roll the walnut shell filter media, wherein the draft tube system comprises a draft tube centrally located in the vessel and forming a peripheral zone positioned between a side wall of the draft tube and a side wall of the vessel;
   a gas inlet positioned below the draft tube and constructed and arranged to deliver a gas and create an upward flow of the gas and at least a portion of the walnut shell filter media in the draft tube and create a downward flow of at least a portion of the walnut shell filter media in the peripheral zone;
   a backwash fluid inlet positioned below the peripheral zone and constructed and arranged to deliver and create an upward flow of backwash fluid to the peripheral area to backwash the walnut shell filter media moving downward in the peripheral zone;
   a backwash outlet positioned in the vessel and above the filter media and constructed and arranged to remove backwash fluid from the vessel; and
   a filtrate outlet positioned below the filter media.

2. The filter apparatus of claim 1, wherein the gas inlet is an air diffuser.

3. The filter apparatus of claim 2, wherein a volume of the filter media in the vessel is at least about three times greater than the volume of the draft tube system.

4. The filter apparatus of claim 3, wherein the volume of the filter media in the vessel is about four times greater than the volume of the draft tube system.

5. The filter apparatus of claim 1, wherein the draft tube system is entirely enveloped by the filter media.

6. The filter apparatus of claim 5, wherein the draft tube comprises one or more side walls that are open at a first end and a second end.

7. The filter apparatus of claim 6, wherein the gas inlet is constructed and arranged to deliver the gas to the first end of the draft tube, the gas inlet positioned below the filter media.

* * * * *